United States Patent
Kuramoto et al.

(10) Patent No.: US 11,097,948 B2
(45) Date of Patent: Aug. 24, 2021

(54) NITRIDE ALUMINUM PARTICLE

(71) Applicant: TOKUYAMA CORPORATION, Shunan (JP)

(72) Inventors: Akimasa Kuramoto, Shunan (JP); Kikuo Yamamoto, Shunan (JP); Mou Ou, Shunan (JP); Saiko Fujii, Shunan (JP); Yukihiro Kanechika, Shunan (JP); Teruhiko Nawata, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 6 days.

(21) Appl. No.: 16/073,608

(22) PCT Filed: Jan. 25, 2017

(86) PCT No.: PCT/JP2017/003497
§ 371 (c)(1),
(2) Date: Jul. 27, 2018

(87) PCT Pub. No.: WO2017/131239
PCT Pub. Date: Aug. 3, 2017

(65) Prior Publication Data
US 2019/0031510 A1    Jan. 31, 2019

(30) Foreign Application Priority Data
Jan. 29, 2016 (JP) ................ JP2016-016667

(51) Int. Cl.
*C01B 21/072* (2006.01)
*C08K 3/28* (2006.01)
(Continued)

(52) U.S. Cl.
CPC ...... *C01B 21/0726* (2013.01); *C01B 21/072* (2013.01); *C08K 3/28* (2013.01);
(Continued)

(58) Field of Classification Search
None
See application file for complete search history.

(56) References Cited

U.S. PATENT DOCUMENTS

| 5,468,697 A | 11/1995 | Yamaguchi et al. |
| 9,145,301 B2 | 9/2015 | Fukunaga et al. |

(Continued)

FOREIGN PATENT DOCUMENTS

| JP | 3-295863 A | 12/1991 |
| JP | 5-139709 A | 6/1993 |

(Continued)

OTHER PUBLICATIONS

International Search Report issued in PCT/JP2017/003497 (PCT/ISA/210), dated Mar. 28, 2017.
(Continued)

*Primary Examiner* — Colin W. Slifka
(74) *Attorney, Agent, or Firm* — Birch, Stewart, Kolasch & Birch LLP (57) ABSTRACT

To provide an aluminum nitride particle having a hexagonal columnar barrel part and bowl-like projection parts at both ends of the columnar part, wherein the long diameter (D) of the barrel part is 10 to 250 μm, the ratio ($L_1$/D) of the distance ($L_1$) between the apexes of the two projection pars to the long diameter (D) of the barrel part is 0.7 to 1.3, and the percentage of the length or thickness ($L_2$) of the barrel part to the distance ($L_1$) between the apexes of the two projection parts is 10 to 60%. The aluminum nitride particle
(Continued)

(a)

(b)

can provide high heat conductivity and excellent electric insulation to a resin when it is filled into the resin.

13 Claims, 3 Drawing Sheets

(51) Int. Cl.
    *C08L 101/00*     (2006.01)
    *C09C 1/40*     (2006.01)

(52) U.S. Cl.
    CPC .............. *C08L 101/00* (2013.01); *C09C 1/40* (2013.01); *C01P 2004/03* (2013.01); *C01P 2004/30* (2013.01); *C01P 2006/32* (2013.01); *C08K 2003/282* (2013.01)

(56) References Cited

U.S. PATENT DOCUMENTS

| | | | | |
|---|---|---|---|---|
| 2010/0255304 A1* | 10/2010 | Amano | ................... | C30B 23/00 428/397 |
| 2015/0353355 A1 | 12/2015 | Fukunaga et al. | | |
| 2015/0376009 A1 | 12/2015 | Fukunaga et al. | | |

FOREIGN PATENT DOCUMENTS

| | | |
|---|---|---|
| JP | 6-321511 A | 11/1994 |
| JP | 2013-189319 A | 9/2013 |
| JP | 2014-201474 A | 10/2014 |
| WO | WO 2013/146894 A1 | 10/2013 |
| WO | WO 2014/113247 A1 | 8/2014 |
| WO | WO 2014/118993 A1 | 8/2014 |

OTHER PUBLICATIONS

Written Opinion of the International Searching Authority issued in PCT/JP2017/003497 (PCT/ISA/237), dated Mar. 28, 2017.
International Preliminary Report on Patentability and English translation of the Written Opinion of the International Searching Authority (Forms PCT/IB/338, PCT/IB/373 and PCT/ISA/237) for Application No. PCT/JP2017/003497, dated Aug. 9, 2018.
Extended European Search Report for corresponding European Application No. 17744468.4, dated Sep. 30, 2019.
Yang et al., "Sulfur-assisted synthesis of nitride nanocrystals," Dalton Transactions, vol. 39, Feb. 5, 2010, pp. 2855-2860.

* cited by examiner

NITRIDE ALUMINUM PARTICLE

TECHNICAL FIELD

The present invention relates to an aluminum nitride particle having a novel form, an aluminum nitride powder containing the same and a production method of the same.

BACKGROUND ART

Since aluminum nitride has high heat conductivity and excellent electric insulation, it is used as an insulation heat radiation filler to be filled into a heat radiation member.

By the way, to improve the heat conductivity of a heat radiation member, it is important that fillers having high heat conductivity should be brought into contact with each other in the above heat radiation member to form a heat conduction path. To form a satisfactory heat conduction path, in general, a spherical filler having a large particle diameter and a spherical filler having a small particle diameter are used in combination and densely filled into a heat radiation member to increase the chances of contact between the fillers. In general, the particle diameter of aluminum nitride required as the above filler having a large particle diameter is 10 μm or more.

To increase the particle diameter of aluminum nitride, for example, a mixture of an alumina powder, a carbon powder and a co-fusion agent is baked in the atmosphere of a mixed gas of nitrogen and carbon monoxide to reduce and nitride the above alumina powder (WO2013/146894). As the co-fusion agent, yttrium oxide, lithium oxide, cesium oxide and calcium oxide are used. However, according to the method of WO2013/146894, it is difficult to obtain aluminum nitride having a particle diameter of 10 μm or more and there is room for improvement in terms of particle diameter.

To obtain aluminum nitride having a particle diameter of 10 μm or more, for example, there is known a method in which, after a sintering aid, an organic binder and a solvent are added to and mixed with an aluminum nitride powder, a spherical granulated power obtained by drying and granulating the resulting mixture is sintered (JP-A 3-295863). Aluminum nitride obtained by this method is spherical and has a particle diameter of about 80 μm. However, aluminum nitride obtained by this method may have large voids therein due to the difference in drying rate between the inside and the outside of the above spherical granulated powder. Further, aluminum nitride particles are bonded together by sintering to form a polycrystal structure, whereby many fine irregularities are formed on the surfaces of the aluminum nitride particles after sintering. Therefore, when the above aluminum nitride particles are filled into a resin to obtain a molded body by using the obtained aluminum nitride particles and the resin, air bubbles are apt to remain at the interface between the above aluminum nitride particle and the resin in addition to the existence of the above voids, whereby the molded body obtained by molding a resin composition comprising the above aluminum nitride particles and the resin has a problem such as the deterioration of insulation resistance.

DISCLOSURE OF THE INVENTION

It is therefore an object of the present invention to provide an aluminum nitride particle having a particle diameter of 10 μm or more which can provide high heat conductivity and excellent electric insulation to a resin stably when it is filled into the resin.

Other objects and advantages of the present invention will become apparent from the following description.

The inventors of the present invention conducted intensive studies to attain the above object and found that aluminum nitride obtained by the Carbo-thermal reduction-nitridation of a raw material mixture containing an alumina powder, a carbon powder and a specific amount of a sulfur component can be grown big without producing voids therein by controlling a reaction atmosphere to specific gas composition at least in the first half of a Carbo-thermal reduction-nitridation reaction, an aluminum nitride particle having such a characteristic form not existent in the prior art that it has a hexagonal columnar barrel part and bowl-like projection parts at both ends of the columnar part is obtained, and the aluminum nitride particle exhibits excellent heat conductivity as compared with conventional spherical particles when it is filled into a resin. The present invention was accomplished based on this finding.

That is, the present invention is an aluminum nitride particle having a hexagonal columnar barrel part and bowl-like projection parts at both ends of the columnar part, wherein the long diameter (D) of the above barrel part is 10 to 250 μm, the ratio ($L_1$/D) of the distance ($L_1$) between the apexes of the above two projection parts to the long diameter (D) of the above barrel part is 0.7 to 1.3, and the percentage of the length or thickness ($L_2$) of the above barrel part to the distance ($L_1$) between the apexes of the above two projection parts is 10 to 60%.

It is preferred that part of one or both of the two projection parts of the above aluminum nitride particle should be a flat surface, and it is more preferred that the flat surface should be polygonal.

The number of voids which have a diameter of 2 μm or more and are existent in the above aluminum nitride particle, is preferably 5 or less for each particle.

The aluminum nitride particle of the present invention is obtained as an aluminum nitride powder containing not less than 40 vol % of aluminum nitride particles having other forms such as indeterminate and spherical forms by a production method which will be described hereinafter. Even in the above aluminum nitride powder, the effect of the aluminum nitride particle of the present invention can be fully obtained.

Further, according to the present invention, there are provided a resin composition comprising the above aluminum nitride particle and a resin and a molded body formed from the resin composition.

The present invention also provides a preferred method of producing the above aluminum nitride powder. That is, according to the present invention, in a method of producing an aluminum nitride powder comprising heating a raw material mixture containing an alumina powder, a carbon powder and a sulfur component in a nitrogen gas atmosphere to reduce and nitride the alumina powder, in a nitridation rate of at least 3 to 50%, the above Carbo-thermal reduction-nitridation is carried out by using a mixed gas of 85 to 55 vol % of a nitrogen gas and 15 to 45 vol % of a diluting gas as the above nitrogen gas atmosphere, and after the end of the Carbo-thermal reduction-nitridation, a temperature which is the heating temperature for the Carbo-thermal reduction-nitridation 30° C. is kept for 10 hours or more in an atmosphere in which the formed aluminum nitride powder is not oxidized.

In the above method, the amount of the above sulfur component is suitably 1.0 to 20 parts by weight based on 100 parts by weight of the alumina powder.

PRATICAL EMBODIMENT OF THE INVENTION

A detailed description is subsequently given of the aluminum nitride particle of the present invention, an aluminum nitride powder containing the aluminum nitride particle, and a method of producing the aluminum nitride powder.

<Aluminum Nitride Particle>

Figure 1:
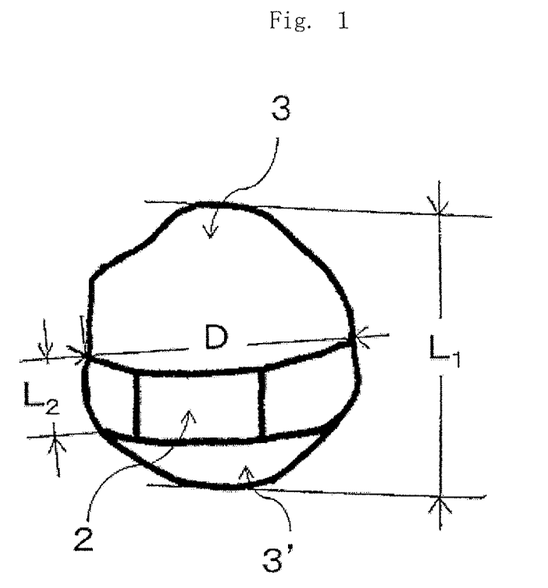
FIG. 1 is a schematic diagram of a typical example of the aluminum nitride particle of the present invention.

As shown in FIG. 1 which is a schematic perspective view of a typical example of the aluminum nitride particle, the aluminum nitride particle 1 of the present invention has a hexagonal columnar barrel part 2 and bowl-like projection parts 3 and 3' at both ends of the columnar part.

The term "hexagonal columnar" means that the particle has a hexagonal columnar form. The hexagonal column is preferably such that the hexagonal planes are regular hexagonal or that the six angles of the regular hexagon are 120±20°. The two hexagonal columnar planes of the hexagonal column may be the same or different. Further, the hexagons of the two hexagonal columnar planes may have the same or different areas. When they have different areas, it is desired that the maximum area difference should be 10%.

The hexagonal columnar barrel part is composed of six squares and/or rectangles defining the two hexagonal columnar planes and the hexagonal column. The six squares and/or rectangles are preferably adjacent rectangles interconnected at short sides. The length of each side of each of the rectangles changes depending on the above hexagons of the two hexagonal columnar planes. The thickness ($L_2$) of the barrel part corresponding to the length of each of the short sides of the rectangle is about 0.7 to 195 μm, preferably 1 to 100 μm, more preferably 3 to 50 μm. When the lengths of the short sides of the rectangles of one particle are different, the above $L_2$ value is understood as average value.

In the aluminum nitride particle of the present invention, the form of the above barrel part is not particularly limited if it is hexagonal columnar. Stated more specifically, although it is most preferred that the particle should be perfectly hexagonal columnar, corner parts are curved or chamfered flat, or part of the barrel part is depressed or projected as long as at least some of the flat faces of the hexagonal column are maintained. It is preferred that the barrel part should be almost perfectly hexagonal columnar as the contact area between the above aluminum nitride particles in the resin can be made large.

Figure 3:
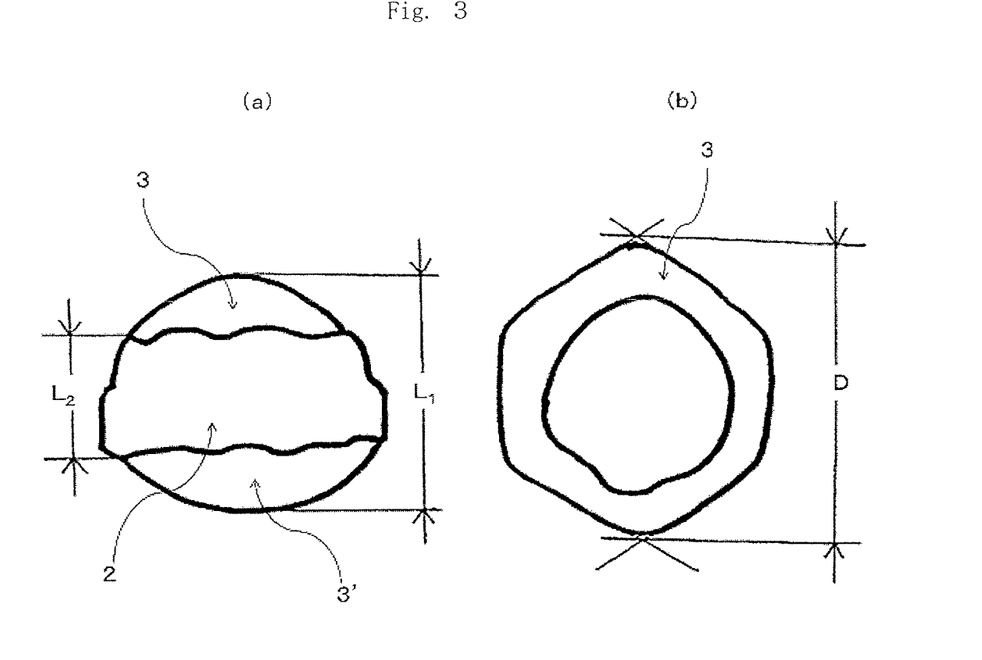
FIG. 3 is a schematic diagram of another example of the aluminum nitride particle of the present invention.

With reference to FIG. 3, FIG. 3 is a schematic diagram of another example of the aluminum nitride particle of the present invention. In this embodiment, it is understood from the front view (a) that the columnar barrel faces are almost flat and it is understood from the plan view (b) that the column is hexagonal defined by six rectangles which are almost flat faces forming the barrel faces.

Figure 4:
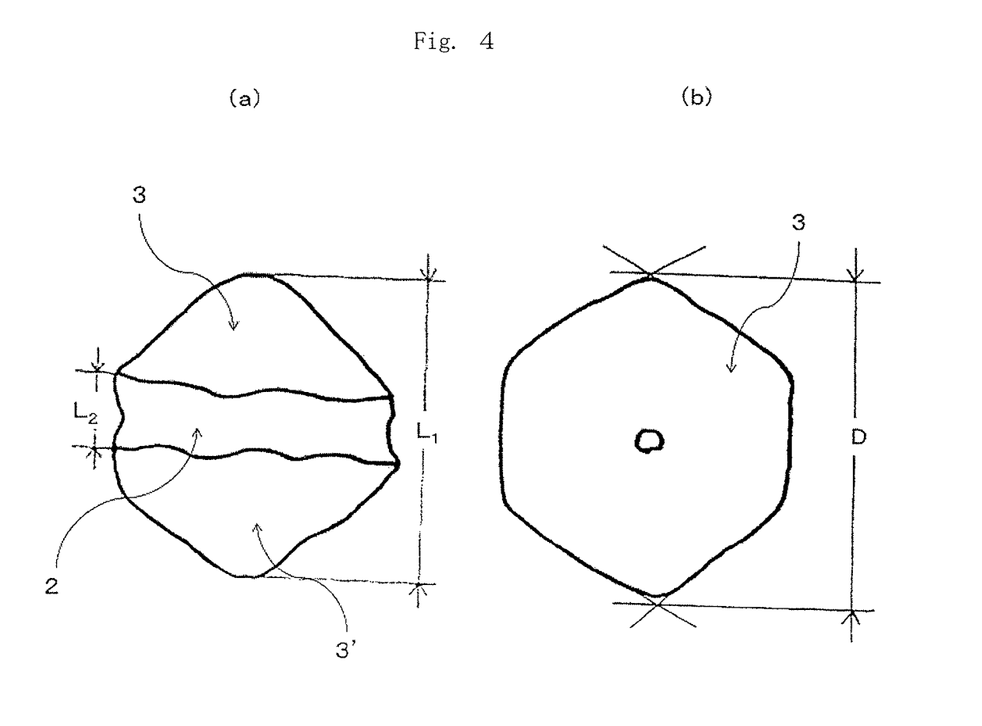
FIG. 4 is a schematic diagram of still another example of the aluminum nitride particle of the present invention.

With reference to FIG. 4, FIG. 4 is a schematic diagram of still another embodiment of the aluminum nitride particle of the present invention. In this embodiment, it is understood from the front view (a) that the columnar barrel faces are not flat and a part near the center part in the columnar direction is depressed from the flat faces and it is understood from the plan view (b) that the column is hexagonal defined by six rectangles defining the bottom faces of the projection parts in contact with the barrel part.

Figure 5:
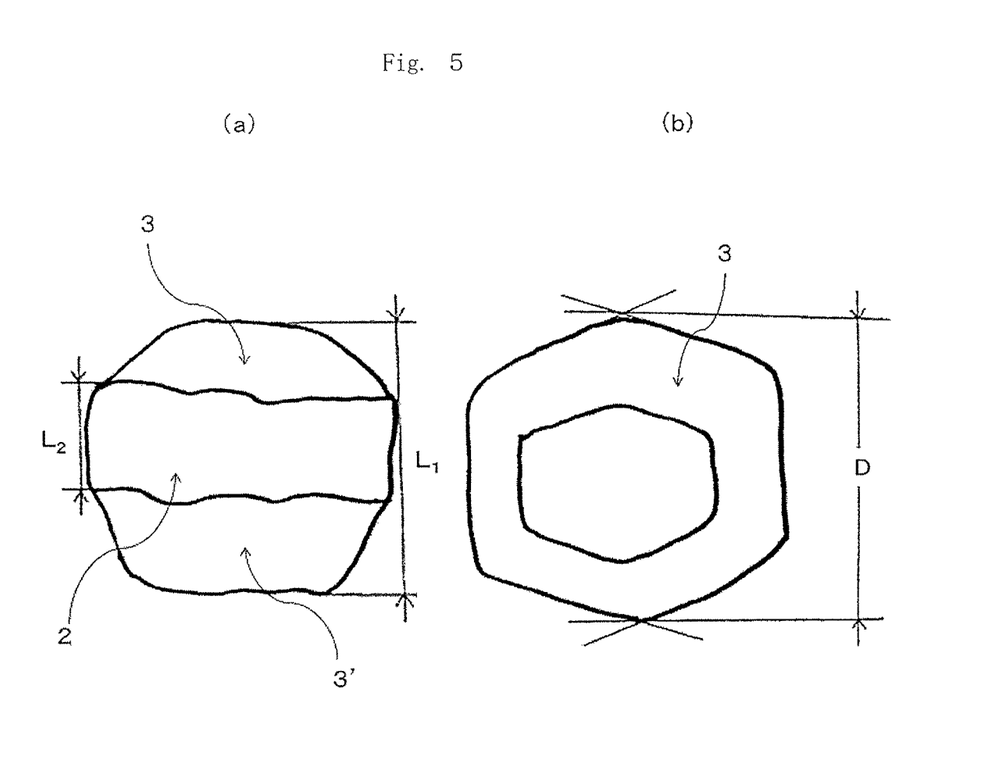
FIG. 5 is a schematic diagram of a further example of the aluminum nitride particle of the present invention.

With reference to FIG. 5, FIG. 5 is a schematic diagram of a further embodiment of the aluminum nitride particle of the present invention. In this embodiment, it is understood from the front view (a) that the columnar barrel faces are formed almost flat and it is understood from the plan view (b) that the column is hexagonal defined by rectangles forming the barrel faces and the projection part has a flat part at the center. It is also understood from the front view (a) that the other projection part which is not shown in the plan view (b) has a flat part at the center as well.

Figure 6:
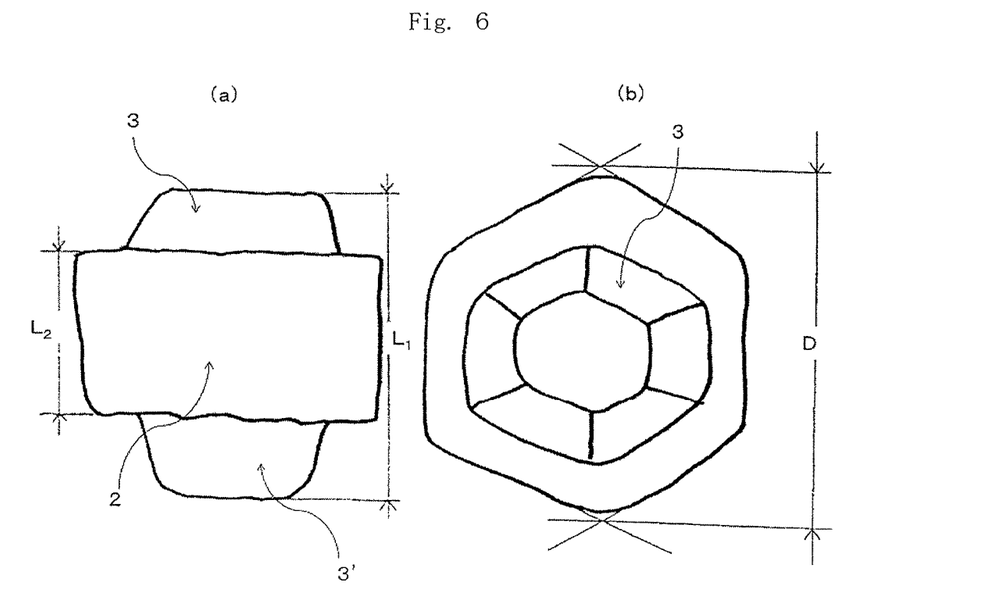
FIG. 6 is a schematic diagram of a still further example of the aluminum nitride particle of the present invention.

With reference to FIG. 6, FIG. 6 is a schematic diagram of a still further embodiment of the aluminum nitride particle of the present invention. In this embodiment, it is understood from the front view (a) that the barrel faces of the column are formed almost flat and it is understood from the plan view (b) that the column is hexagonal defined by rectangles forming the barrel faces and the projection parts have a flat part at the center and are raised toward the flat parts along the hexagonal form of the barrel part. It is also understood that the size of the projection part is smaller than the long diameter of the barrel part.

In the aluminum nitride particle of the present invention, the form of each of the above projection parts may be conical, dome-like or truncated pyramid-like and is not particularly limited but preferably part of the projection part is preferably flat, thereby making it possible to increase the contact area between the aluminum nitride particles advantageously.

The aluminum nitride particle of the present invention is further specified as follows. That is, the long diameter (D) of the above barrel part is 10 to 250 μm, preferably 10 to 100 μm, particularly preferably 20 to 80 μm. Further, the ratio ($L_1/D$) of the distance ($L_1$) between the apexes of the above two projection parts 3 and 3' to the long diameter (D) of the above barrel part is 0.7 to 1.3, preferably 0.8 to 1.1, and the percentage of the length or thickness ($L_2$) of the barrel part to the distance ($L_1$) between the apexes of the above two projection parts is 10 to 60%, preferably 20 to 60%, particularly preferably 25 to 45%.

The long diameter (D) of the barrel part is the largest one of three distances, each between two opposed corners of the hexagonal columnar plane. When two corners are not clearly formed by crossing two straight lines (corresponding to the long sides of the above rectangles), corners formed by extending two straight lines are considered as the above corners to obtain the distance.

Since the above aluminum nitride particle has a long diameter and a short diameter close to those of a sphere as understood from the fact that the $L_1/D$ is 0.7 to 1.3, when the aluminum nitride particle is filled into the resin, it has low orientation and can exhibit stable heat conductivity.

The size of each of the above projection parts may be larger or smaller than the long diameter of the above barrel part. The ratio of the long diameter of the projection part to the long diameter of the above barrel part is preferably 0.8 to 1.2, particularly preferably 0.9 to 1.1 so that the above aluminum nitride particle can have a form close to a preferred spherical form.

The aluminum nitride particle having the above characteristic form is provided by the present invention for the first time and has excellent heat conductivity which cannot be attained by a conventional spherical aluminum nitride particle in a resin due to its form.

Since the aluminum nitride particle of the present invention is obtained by particle growth due to its production method, the number of voids in the particle is small which is one of the characteristics of the aluminum nitride particle. Stated more specifically, the number of voids having a diameter of 2 μm or more in the above aluminum nitride particle is preferably 5 or less, particularly preferably 3 or less for each particle.

The constitution of the above aluminum nitride particle which has the hexagonal columnar barrel part and the projection parts at both ends of the columnar part can be confirmed by SEM as shown in Examples which will be given hereinafter.

<Aluminum Nitride Powder>

The aluminum nitride particle of the present invention can be obtained by a production method which will be described hereinafter. Since aluminum nitride except for the above aluminum nitride particle is partially produced, an aluminum nitride powder containing the aluminum nitride particle is generally obtained. Since the aluminum nitride powder of the present invention exhibits the above characteristic properties of the above aluminum nitride particle fully, it contains not less than 40 vol %, preferably not less than 60 vol % of the above aluminum nitride particle. As a matter of course, aluminum nitride except for the above aluminum nitride particle can be removed and separated from the above aluminum nitride powder with known classification means, for example, classification means using a sieve to increase the content of the above aluminum nitride particle.

<Use of Aluminum Nitride Particle>

The aluminum nitride particle of the present invention is not limited to particular use purposes and can be used for known purposes without restriction. Examples of the preferred use of the aluminum nitride particle include use as a filler in a resin to improve electric insulation and provide heat conductivity. For the use of the above aluminum nitride particle, a resin composition comprising the aluminum nitride particle and a resin and a molded body obtained by molding the resin composition have high electric insulation and high heat conductivity.

<Resin>

Examples of the resin used in the present invention include thermoplastic resins such as polyolefins, vinyl chloride resin, methyl methacrylate resin, nylon resin and fluororesin, thermosetting resins such as epoxy resin, phenol resin, urea resin, melamine resin, unsaturated polyester resin and silicon resin, and synthetic rubbers.

<Resin Composition>

The resin composition of the present invention is obtained by mixing the above aluminum nitride powder with the resin uniformly by means of a known mixer according to the type of the above resin to disperse the aluminum nitride particles in the resin. As the above mixer, for example, ordinary kneading machines such as roll, kneader, Banbury mixer, and revolving and rotational mixers are preferably used.

The amount of the aluminum nitride particle is determined in consideration of the dispersibility of the aluminum nitride particle and the heat conductivity and moldability of the obtained molded body. For example, the aluminum nitride particle is used in an amount of preferably 300 to 1,000 parts by weight, more preferably 400 to 800 parts by weight based on 100 parts by weight of the resin. The resin composition of the present invention may comprise components except for the above aluminum nitride particle and the resin as long as the excellent effect of the present invention is not greatly impaired. As the components which may be contained in the resin composition of the present invention, for example, one or more fillers such as aluminum nitride except for the above aluminum nitride particle, alumina, boron nitride, zinc oxide, silicon nitride, silicon carbide and graphite may be filled. According to purpose, the forms and average particle diameters of the aluminum nitride particles of the present invention and a filler except for the aluminum nitride particles can be selected.

<Molded Body>

The molded body of the present invention can be obtained when the above thermoplastic resin or thermosetting resin is used as the resin.

Although the molding method for molding the molded body of the present invention is not particularly limited, conventionally known molding methods such as injection molding, transfer molding, extrusion molding, bulk molding, compound molding, compression molding and casting using a solvent may be used according to the type of the resin.

The form of the molded body of the present invention is not particularly limited as long as the effect of the present inventio is not greatly impaired. It may be sheet-like, film-like, disk-like or rectangular.

<Aluminum Nitride Powder Production Method>

In a method in which a raw material mixture containing an alumina powder, a carbon powder and a sulfur component is heated in a nitrogen gas atmosphere to reduction-nitride the alumina powder as a typical method of producing an aluminum nitride powder containing the aluminum nitride particles of the present invention, nitridation is carried out at a nitridation rate of at least 3 to 50% in the presence of a mixed gas of 85 to 55 vol % of a nitrogen gas and 15 to 45 vol % of a diluting gas, and a temperature of (the heating temperature for Carbo-thermal reduction-nitridation ±30° C.) is kept for 10 hours or more in an atmosphere in which the formed aluminum nitride powder is not oxidized after the end of Carbo-thermal reduction-nitridation.

A detailed description is subsequently given of the above method.

<<Starting Materials>>

(Alumina Powder)

As the alumina powder which is one of the above raw materials, for example, known alumina such as α-alumina and γ-alumina may be used. Out of these, α-alumina is particularly preferably used. The purity of α-alumina is preferably not less than 99.0 wt %, more preferably not less than 99.5 wt %. The average particle diameter of α-alumina is preferably 0.5 to 50 μm, more preferably 1 to 30 μm.

(Carbon Powder)

In the method of producing the aluminum nitride powder of the present invention, as the carbon powder used as a reducing agent, known carbon such as furnace black, channel black, thermal black and acetylene black may be used. The average particle diameter of the carbon powder is preferably not more than 100 nm, more preferably not more than 50 nm. Further, the DBP oil absorption of the carbon powder is preferably 50 to 150 cm$^3$/100 g, more preferably 70 to 130 cm$^3$/100 g.

In the method of producing the aluminum nitride powder of the present invention, synthetic resin condensates such as phenol resin, melamine resin and epoxy resin condensates, hydrocarbon compounds such as pitch and tar, and organic compounds such as cellulose, sucrose, starch, polyvinylidene chloride and polyphenylene may be used as carbon sources as long as the effect of the present invention is not impaired.

(Sulfur Component) In the method of producing the aluminum nitride powder of the present invention, the sulfur component is an essential component for the production of the aluminum nitride particle of the present invention which functions at the time of adjusting an atmosphere for a Carbo-thermal reduction-nitridation reaction which will be detailed hereinafter. The type of the sulfur component is not particularly limited if it can co-melt with the alumina powder as a raw material. For example, sulfur alone and sulfur compounds such as aluminum sulfide, nitrogen sulfide and thiouric acid may be used. The above sulfur components may be used alone or in combination. A sulfur component may be contained in the carbon powder and serve as part of the sulfur component of the present invention.

<<Raw Material Mixing Step>>

In the method of producing the aluminum nitride powder of the present invention, when an excessive amount of the carbon powder is used, contact between alumina particles is suppressed, thereby preventing particle growth. As a result, the particle diameter of the obtained aluminum nitride particle tends to become very small. Therefore, the amount of the carbon powder is preferably 36 to 200 parts by weight, more preferably 40 to 100 parts by weight based on 100 parts by weight of the alumina powder.

In the method of producing the aluminum nitride powder of the present invention, the amount of the sulfur component contained in the raw material mixture containing the alumina powder and the carbon powder is preferably 1.0 to 20 parts by weight as elemental sulfur based on 100 parts by weight of the alumina powder. Since the volatilized sulfur may corrode the internal wall of a Carbo-thermal reduction-nitridation reaction furnace, the amount of the above sulfur component is preferably small, more preferably 2.5 to 10 parts by weight. The above range of the amount of the sulfur component can be satisfied by considering and adjusting the amount of sulfur contained in the carbon fiber and the amount of the sulfur powder and/or the sulfur compound to be added to the raw material mixture. When the above range is satisfied in consideration of the amount of sulfur contained in the carbon powder, the amount of the carbon powder may be adjusted to achieve the above range, or a carbon powder having a high content of sulfur and a carbon powder having a low content of sulfur are used to achieve the above range by adjusting the mixing ratio of these.

To mix the above raw material mixture, any means is acceptable if it is capable of mixing together the raw materials uniformly. A mixer such as a vibration mill, bead mill, ball mill, Henschel mixer, drum mixer, vibration agitator or twin-cylinder mixer may be used.

<<Carbo-Thermal Reduction-Nitridation Step>>

The method of producing the aluminum nitride powder of the present invention is a method in which the Carbo-thermal reduction-nitridation of an alumina powder is carried out by heating a raw material mixture containing the above alumina powder, carbon powder and sulfur component in a nitrogen gas atmosphere, wherein Carbo-thermal reduction-nitridation is carried out at a nitridation rate of at least 3 to 50% in a mixed gas of 85 to 55 vol % of a nitriding gas and 15 to 45 vol % of a diluting gas as the above nitrogen gas atmosphere, and a temperature of (the heating temperature for Carbo-thermal reduction-nitridation ±30° C.) is kept for 10 hours or more in an atmosphere in which the formed aluminum nitride powder is not oxidized after the end of Carbo-thermal reduction-nitridation.

In the method of producing the aluminum nitride powder of the present invention, a temperature at which the Carbo-thermal reduction-nitridation reaction proceeds is used as the above heating temperature, for example, preferably 1,500 to 2,000° C.

In the method of producing the aluminum nitride powder of the present invention, the above diluting gas is made existent in the atmosphere to adjust the ratio of the nitrogen gas in the nitrogen gas atmosphere and contains a carbon monoxide gas generated from the raw material mixture. The type of the above diluting gas is preferably carbon monoxide alone or a mixed gas of carbon monoxide and an inert gas such as argon.

In the above method, the Carbo-thermal reduction-nitridation reaction is preferably carried out while a nitrogen gas is let flow into a reactor containing the raw material mixture. In this case, the ratio of the diluting gas in the nitrogen gas atmosphere in which the raw material mixture is existent can be checked by measuring the gas composition of an exhaust gas from the reactor. The nitridation rate of the alumina powder as a raw material can be confirmed by sampling a reaction product in the reactor. When the inside temperature of the reactor is so high that sampling is difficult, a Carbo-thermal reduction-nitridation reaction under the same conditions is stopped at a predetermined time and a reaction product is taken out to measure the nitridation rate, thereby making it possible to confirm the nitridation rate in the reaction.

When the ratio of the diluting gas is lower than 15 vol % at the time when the nitridation rate of the alumina powder is lower than 50%, the Carbo-thermal reduction-nitridation reaction becomes too fast, whereby satisfactory particle growth becomes impossible, thereby making it difficult to obtain an aluminum nitride particle having a large particle diameter and the above characteristic form of the present invention. When the ratio of the above diluting gas is higher than 45 vol %, the Carbo-thermal reduction-nitridation reaction is suppressed excessively, whereby the Carbo-thermal reduction-nitridation reaction takes a long time, which is industrially disadvantageous, and hexagonal columnar aluminum nitride having no projection parts is obtained or an unreacted alumina powder remains very often.

In the present invention, as means for adjusting the ratio of the diluting gas in the nitrogen gas atmosphere in the reactor, there are (1) a method in which a mixed gas is prepared by mixing a predetermined amount of a diluting gas prepared separately with a nitrogen gas and supplied into a reactor in which the raw material mixture is contained in a carbon vessel with an open top, so-called "setter", (2) a method in which a mixture of the alumina powder and the carbon powder is placed at an upstream side of the raw material mixture in a flow of a nitrogen gas flowing in the reactor and the concentration of a carbon monoxide gas contained in a nitrogen gas to be supplied to the raw material mixture is adjusted with carbon monoxide produced by the Carbo-thermal reduction-nitridation of the mixture, and (3) a method in which the raw material mixture is contained in the above setter to form a relatively thick layer, a nitrogen gas is supplied into the setter, and the amount of the nitrogen gas diffused into the inside of the above layer is controlled to form an atmosphere in which the ratio of a carbon monoxide diluting gas in a nitrogen gas atmosphere is adjusted.

In these methods, the ratio of the diluting gas in the nitrogen gas atmosphere in the reactor is adjusted in consideration of the amount of a carbon monoxide gas generated from the raw material mixture.

In the method (2), the amount of the mixture of the alumina powder and the carbon powder situated at an upstream side of the raw material mixture is determined to satisfy the above concentration by checking variations in the amount of the generated carbon monoxide gas in advance. In general, the above amount of the mixture of the alumina powder and the carbon powder which has been prepared within the range of the ratio of the alumina powder and the carbon powder is 0.7 to 1.3 times the amount of the raw material mixture based on the alumina powder.

In the method (2), a case in which the supply of the carbon monoxide gas becomes insufficient and the ratio of the carbon monoxide gas becomes lower than 15 vol % may occur temporarily in the initial stage of the Carbo-thermal reduction-nitridation reaction. In the present invention, it is confirmed that the above state is allowed until the nitridation rate becomes 3%, preferably 5%.

Therefore, the lower limit of the range of the nitridation rate at which 15 to 45 vol % of a carbon monoxide gas is existent in a nitrogen gas can be made 3%. As a matter of course, it is most preferred that the above ratio of the carbon monoxide gas should be kept from the beginning of the Carbo-thermal reduction-nitridation reaction.

In the method (3), it is preferred that the thickness of the raw material mixture in the setter should be not smaller than 50 mm, specifically not smaller than 70 mm in order to adjust the ratio of the diluting gas to the above range when a nitrogen gas enters a space in the setter to promote Carbo-thermal reduction-nitridation. When the thickness of the raw material mixture is too large, the nitrogen gas is hardly supplied. Therefore, the upper limit of the thickness is preferably not more than 200 mm, particularly preferably not more than 150 mm.

In the production method of the present invention, after the nitridation rate of the above alumina powder exceeds 50%, the supply of the diluting gas may be stopped or made small, thereby making it possible to reduce the ratio of the diluting gas to less than 15 vol %, or nitridation may be terminated under the same conditions.

In the production method of the present invention, after the end of the above Carbo-thermal reduction-nitridation, it is necessary to keep a temperature of (the heating temperature for Carbo-thermal reduction-nitridation ±30° C.) for at least 10 hours, preferably at least 15 hours in an atmosphere in which the formed aluminum nitride powder is not oxidized, preferably in an atmosphere after the end of the Carbo-thermal reduction-nitridation reaction in order to obtain an aluminum nitride particle having the above characteristic form. When the above retention time becomes too long, it is industrially disadvantageous and the above characteristic form may be lost. Therefore, the above retention time is preferably not longer than 50 hours, particularly preferably not longer than 30 hours.

The Carbo-thermal reduction-nitridation step of the present invention may be carried out by using a known apparatus capable of controlling a reaction atmosphere. As the apparatus, an atmosphere control type high-temperature furnace in which high-frequency induction heating or heating with a heater is carried out is used. A continuous nitridation reaction furnace such as a batch furnace, pusher type tunnel furnace or vertical furnace may also be used.

<<Oxidizing Step>>

In the method of producing the aluminum nitride powder of the present invention, since the aluminum nitride powder after the Carbo-thermal reduction-nitridation reaction contains an excessive carbon powder, the excessive carbon powder is preferably removed by oxidation as required. As an oxidizing gas for oxidation, a gas capable of removing carbon, such as air, oxygen or carbon dioxide, may be used without restriction. The oxidizing temperature is preferably 500 to 900° C.

EXAMPLES

The following examples are provided for the purpose of further illustrating the present invention but are in no way to be taken as limiting.

The physical properties of raw materials used in Examples and Comparative Examples are described below.

Alumina powder

α-alumina: average particle diameter of 1.183 μm carbon powder

Carbon powder A: average particle diameter of 19 nm, DBP absorption of 116 cm$^3$/100 g, sulfur content of 210 ppm Carbon powder B: average particle diameter of 20 nm, DBP absorption of 115 cm$^3$/100 g, sulfur content of 3,000 ppm sulfur component sulfur powder: purity of not less than 98%

Physical properties in Examples and Comparative Examples were measured by the following methods.

(1) Particle Diameter of Aluminum Nitride Particle

The aluminum nitride particle of the present invention was selected from an image observed through a 2,000-power or 100-power SEM (TM3030 of Hitachi High-Technologies Corporation) to measure the diameter (D) of the barrel part, the distance ($L_1$) between the apexes of the projection parts and the length ($L_2$) of the barrel part of the aluminum nitride particle. The ratio ($L_1/D$) of the distance ($L_1$) between the apexes of the projection parts to the diameter (D) of the barrel part and the percentage of the length ($L_2$) of the barrel part to the distance ($L_1$) between the apexes of the projection parts were calculated.

(2) Content of Aluminum Nitride Particle of the Present Invention in Aluminum Nitride Powder The above aluminum nitride particles and other aluminum nitride particles were selected from the observation image of the 2,000-power or 100-power SEM to approximate all the above aluminum nitride particles and the other particles to a sphere, and the total volume of the above aluminum nitride particles in the field of view was obtained from the measurement value of the diameter (D) of the barrel part to obtain the vol % of the above aluminum nitride particle based on the volume of the aluminum nitride powder containing the above aluminum nitride particles and the other particles.

(3) Voids Existent in Aluminum Nitride Particle

The aluminum nitride powder containing the above aluminum nitride particles was filled into an epoxy resin which was then cast into a mold and cured by a thermal press device to produce a sheet having a thickness of 100 μm.

A cross-section observation sample in the thickness direction of the above sheet was prepared from the sheet by a cross-section processing machine to select 5 aluminum nitride particles at random from a 2,000-power or 100-power SEM observation image and count the number of voids having a diameter of not less than 2 μm. The average number of voids per each particle is given.

(4) Heat Conductivity

A test sample was molded from the resin composition to obtain heat conductivity from thermal diffusion factor, density and specific heat based on the following equation.

$$\text{Heat conductivity} = \text{thermal diffusion factor} \times \text{density} \times \text{specific heat}$$

The thermal diffusion factor was measured by a laser flash method, the density was measured by an Archimedes method, and the specific heat was measured by DSC.

(5) Insulation Resistance

This was measured by a short-time process for obtaining a breakdown voltage (BDV) at a constant pressure elevation rate (2 kV/sec) up to the breakage of a test sample.

(6) Aluminum Nitride Nitridation Rate

This was obtained based on the following equation (1) by using a calibration curve method from the ratio of the peak (32.2°) of aluminum nitride (AlN) and the peak (43.5°) of the alumina component (α-alumina) by X-ray diffraction (CuKα). When another component is contained, the main peak of the component is selected and added to the denominator of the equation (1).

$$\text{Aluminum nitride nitridation rate (\%)} = \text{peak intensity of aluminum nitride}/(\text{peak intensity of aluminum nitride} + \text{peak intensity of alumina}) \times 100 \quad (1)$$

Example 1

A sulfur powder was added to a mixture of 100 parts by weight of an alumina powder and 50 parts by weight of a carbon powder to ensure that the amount of a sulfur component in the mixture became 2.5 parts by weight based on 100 parts by weight of the above alumina powder and mixed with the mixture by means of a vibration agitator until they were mixed together uniformly to obtain a raw material mixture.

The above raw material mixture was put into a carbon setter to a thickness of 50 mm, the setter was set in a reactor through which nitrogen could flow, and Carbo-thermal reduction-nitridation was carried out at a heating temperature of 1,750° C. while a nitrogen gas was let flow.

A carbon monoxide gas was mixed with the nitrogen gas which was let flow through the above reactor to ensure that the proportion of the carbon monoxide gas of an exhaust gas from the reactor became 23 vol %.

When the nitridation rate of the reaction product was measured under the above conditions after 5 hours and after 7 hours, it was 90% after 5 hours and about 100% after 7 hours.

Thereafter, the supply of carbon monoxide was stopped, the heating temperature was kept for 13 hours and then the reaction product was taken out from the reactor.

Then, the above reaction product was heated at 700° C. for 5 hours in the atmosphere to burn and remove an unreacted carbon powder so as to obtain an aluminum nitride powder. The proportion of the aluminum nitride particles having the characteristic form of the present invention contained in the obtained aluminum nitride powder was 90 vol %. The particle diameters of the aluminum nitride particles were measured by the above measurement method for the particle diameters of aluminum nitride particles to calculate the average particle diameter of the above aluminum nitride particles. Aluminum nitride particles (particles A, B and C) having a typical size and a typical form were selected from the aluminum nitride particles to measure their particle diameters. The results are shown in Table 2.

The particle diameters and proportion of aluminum nitride particles contained in the above aluminum nitride power and voids existent in each of the aluminum nitride particles were measured by the above methods. The results are shown in Table 2.

Example 2

Figure 2:
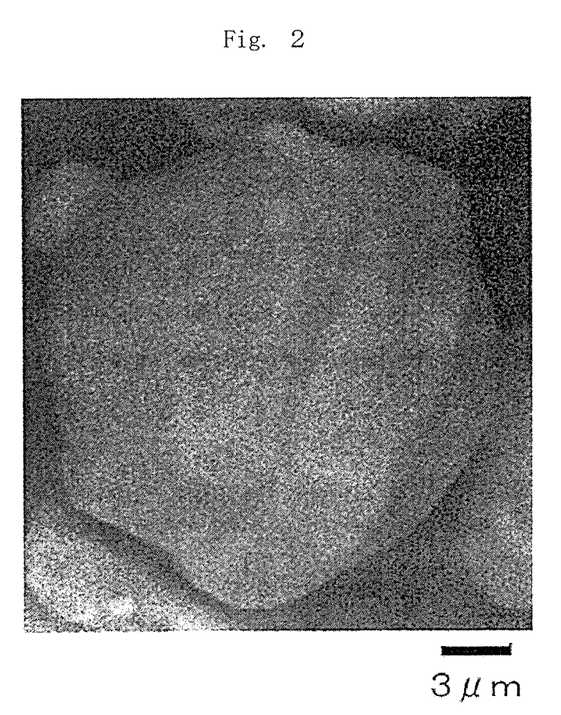
FIG. 2 is a SEM (Scanning Electron Microscope) photograph showing a typical example of an aluminum nitride particle obtained in Example 2.

An aluminum nitride powder was obtained in the same manner as in Example 1 except that the raw material composition in Example 1 was changed as shown in Table 1. The particle diameters and proportion of aluminum nitride particles contained in the obtained aluminum nitride powder and voids existent in each aluminum nitride particle were measured by the above methods. The results are shown in Table 2. An SEM Photo of the aluminum nitride particles obtained in this example is shown in FIG. 2.

Example 3

An aluminum nitride powder was obtained in the same manner as in Example 1 except that the raw material composition in Example 1 was changed as shown in Table 1. The particle diameters and proportion of aluminum nitride particles contained in the obtained aluminum nitride powder and voids existent in each aluminum nitride particle were measured by the above methods. The results are shown in Table 2.

Example 4

An aluminum nitride powder was obtained in the same manner as in Example 1 except that the raw material composition in Example 1 was changed as shown in Table 1. The particle diameters and proportion of aluminum nitride particles contained in the obtained aluminum nitride powder and voids existent in each aluminum nitride particle were measured by the above methods. The results are shown in Table 2.

Example 5

An aluminum nitride powder was obtained in the same manner as in Example 1 except that the raw material composition in Example 1 was changed as shown in Table 1. The particle diameters and proportion of aluminum nitride particles contained in the obtained aluminum nitride powder and voids existent in each aluminum nitride particle were measured by the above methods. The results are shown in Table 2.

Example 6

A molded body was produced by using an aluminum nitride powder containing the above aluminum nitride particles as a filler and an epoxy resin as a resin.

Stated more specifically, a mixture of 100 parts by weight of an epoxy resin (jER828 of Mitsubishi Chemical Corporation) as the resin and 5 parts by weight of a curing agent (imidazole-based curing agent, Cure Sol 2E4MZ of Shikoku Chemicals Corporation) was prepared. Then, 633 parts by weight of an aluminum nitride powder containing 70 vol % of aluminum nitride particles having an average particle diameter of 22 μm obtained by the production method of the present invention was added to and mixed with the above mixture in a mortar to produce a resin composition.

Part of the obtained resin composition was cast into a mold and cured at a temperature of 100° C. and a pressure of 20 MPa for a retention time of 2 hours by using a thermal press device to produce a test sample having a diameter of 10 mm and a thickness of 1 mm, and the heat conductivity of the test sample was measured by a laser flash method using a laser flash thermoproperty measuring instrument (LFA-502 of Kyoto Electronics Manufacturing Co., Ltd.).

2-methoxy ethanol was added to and mixed with part of the obtained resin composition in a mortar to obtain slurry. After the obtained slurry was vacuum defoamed, it was applied to a PET film with a bar coater, dried at 80° C. and cured at 2 MPa and 120° C. for 30 minutes by a thermal press device. After curing, the PET film was removed to obtain a molded sheet having a thickness of about 100 μm. The insulation breakdown voltage of the obtained molded sheet was measured by using an insulation breakdown voltage measuring instrument (THK-5031AMP of Tamadensoku Co., Ltd.). The results are shown in Table 3.

Comparative Example 1

An aluminum nitride powder was obtained in the same manner as in Example 1 except that the raw material composition in Example 1 was changed as shown in Table 1.

When the obtained aluminum nitride powder was observed through SEM, most of the above powder was plate-like aluminum nitride and the aluminum nitride particles of the present invention were not contained.

Comparative Example 2

An aluminum nitride powder was obtained in the same manner as in Example 1 except that the raw material composition in Example 1 was changed as shown in Table 1.

When the obtained aluminum nitride powder was observed through SEM, most of the above powder was aluminum nitride which had a small particle diameter and was not grown into particles, and the aluminum nitride particles of the present invention were not contained.

Comparative Example 3

A molded body was produced in the same manner as in Example 6 except that 633 parts by weight of an aluminum nitride powder containing 70 vol % of spherical aluminum nitride (made of Tokuyama Corporation) having an average particle diameter of 22 μm based on 100 parts by weight of a resin used in Example 6 and measured for heat conductivity and insulation breakdown voltage. The results are shown Table 3.

TABLE 1

| Raw material composition | Example | | | | | Comparative Example | |
|---|---|---|---|---|---|---|---|
| | 1 | 2 | 3 | 4 | 5 | 1 | 2 |
| Alumina powder | 100 | 100 | 100 | 100 | 100 | 100 | 100 |
| Carbon powder* A | 50 | 50 | 50 | 0 | 50 | 50 | 100 |
| B | 0 | 0 | 0 | 100 | 0 | 0 | 0 |
| Sulfur component* | 2.5 | 5 | 10 | 10 | 5 | 0 | 0 |
| proportion of carbon monoxide gas in nitrogen gas [vol %] | 23 | 23 | 23 | 35 | 40 | 35 | 10 |

*Based on 100 parts by weight of alumina powder

TABLE 2

| | Aluminum nitride particles | Example | | | | | Comparative Example | |
|---|---|---|---|---|---|---|---|---|
| | | 1 | 2 | 3 | 4 | 5 | 1 | 2 |
| Proportion in aluminum nitride powder [vol %] | | 90 | 85 | 85 | 50 | 80 | 0 | 0 |
| Average of total | Diameter (D) of barrel part [μm] | 17 | 21 | 15 | 80 | 217 | 15 | — |
| | Ratio ($L_1/D$) of distance between apexes of projection parts to D | 1.1 | 1.0 | 0.8 | 1.0 | 1.1 | 0.46 | — |
| | percentage of length ($L_2$) of barrel part to $L_1$ [%] | 57 | 43 | 50 | 45 | 15 | 33 | — |
| Particle A | D[μm] | 10 | 17 | 18 | 60 | 200 | — | — |
| | $L_1/D$ [—] | 0.7 | 1.2 | 0.8 | 1.0 | 1.2 | — | — |
| | percentage of $L_2$ to $L_1$ [%] | 55 | 45 | 47 | 40 | 15 | — | — |
| Particle B | D[μm] | 15 | 21 | 21 | 80 | 210 | — | — |
| | $L_1/D$ [—] | 1.0 | 1.0 | 0.9 | 0.8 | 1.2 | — | — |
| | percentage of $L_2$ to $L_1$ [%] | 55 | 43 | 50 | 50 | 14 | — | — |
| Particle C | D[μm] | 30 | 19 | 15 | 100 | 240 | — | — |
| | $L_1/D$ [—] | 1.1 | 1.1 | 0.9 | 1.2 | 0.9 | — | — |
| | percentage of $L_2$ to $L_1$ [%] | 50 | 44 | 49 | 40 | 16 | — | — |
| Number of voids | | 1 | 0 | 2 | 2 | 2 | — | — |

TABLE 3

| Molded body | Example 6 | Comparative Example 3 |
|---|---|---|
| Heat conductivity [W/m · K] | 10 | 8.0 |
| Insulation breakdown voltage [kV/100 μm] | 7.7 | 5.0 |

Effect of the Invention

The aluminum nitride particle of the present invention has a large particle diameter and such a characteristic form that it has a hexagonal columnar barrel part and bowl-like projection parts at both ends of the columnar part as described above. When this particle is filled into a resin as a filler, the chances of surface contact between aluminum nitride particles grow due to the above hexagonal columnar planes, thereby making it possible to improve the heat conductivity of the above molded body as compared with conventional spherical particles. Since the above aluminum nitride particle has a ratio of long diameter to short diameter close to that of a sphere, it has high flowability and exhibits high kneadability with a resin.

A particle having at least one flat face on the projection parts as a preferred example can further improve heat conductivity.

Voids are hardly formed in the aluminum nitride particle of the present invention due to its production method, and an aluminum nitride particle having 5 or less voids having a diameter of 2 μm or more existent therein as a preferred example can provide high insulation resistance strength to a resin obtained by filling the particle.

The invention claimed is:

1. An aluminum nitride particle comprising:
   a hexagonal columnar barrel part, and
   two convex projection parts,
   wherein:
   one of the two convex projection parts is located at one end of the columnar barrel part, and another one of the two convex projection parts is located at an opposite end of the columnar barrel part,
   a long diameter (D) of the columnar barrel part is 10 to 250 μm,
   a ratio ($L_1/D$) of a distance ($L_1$) between apexes of the two projection parts to the long diameter (D) of the columnar barrel part is 0.7 to 1.3, and
   a percentage of a length or thickness ($L_2$) of the columnar barrel part to the distance ($L_1$) between the apexes of the two projection parts is 10 to 60%.

2. The aluminum nitride particle according to claim 1, wherein part of each of the projection parts has a flat portion at a center of a top portion of the projection part.

3. The aluminum nitride particle according to claim 2, wherein the particle has 5 or less voids having a diameter of 2 μm or more.

4. An aluminum nitride powder containing not less than 40 vol % of the aluminum nitride particle of claim 2.

5. A resin composition comprising the aluminum nitride particle of claim 2 and a resin, wherein the amount of the aluminum nitride particle in the resin composition is 300 to 1,000 parts by weight based on 100 parts by weight of the resin.

6. The aluminum nitride particle according to claim 1, wherein the particle has 5 or less voids having a diameter of 2 μm or more.

7. An aluminum nitride powder containing not less than 40 vol % of the aluminum nitride particle of claim 6.

8. A resin composition comprising the aluminum nitride particle of claim 6 and a resin, wherein the amount of the aluminum nitride particle in the resin composition is 300 to 1,000 parts by weight based on 100 parts by weight of the resin.

9. An aluminum nitride powder containing not less than 40 vol % of the aluminum nitride particle of claim 1.

10. A resin composition comprising the aluminum nitride particle of claim 1 and a resin, wherein the amount of the aluminum nitride particle in the resin composition is 300 to 1,000 parts by weight based on 100 parts by weight of the resin.

11. The resin composition according to claim 10, wherein the resin is a thermoplastic resin or thermosetting resin.

12. A molded body formed from the resin composition of claim 11.

13. A molded body formed from the resin composition of claim 10.

* * * * *